United States Patent
Peret et al.

(10) Patent No.: US 12,138,660 B2
(45) Date of Patent: Nov. 12, 2024

(54) ELECTROACOUSTIC DEVICE

(71) Applicants: UNIVERSITE DE LILLE, Lille (FR); CENTRALE LILLE INSTITUT, Villeneuve d'Ascq (FR); UNIVERSITE POLYTECHNIQUE HAUTS-DE-FRANCE, Valenciennes (FR); CENTRE NATIONAL DE LA RECHERCHE SCIENTIFIQUE, Paris (FR); YNCREA HAUTS DE FRANCE, Lille (FR); VALEO SYSTEMES D'ESSUYAGE, Le Mensil Saint Denis (FR)

(72) Inventors: Adrien Peret, Issoire (FR); Frederic Bretagnol, Issoire (FR); Michaël Baudoin, Villeneuve d'Ascq (FR); Olivier Bou Matar-Lacaze, Villeneuve d'Ascq (FR)

(73) Assignees: UNIVERSITE DE LILLE, Lille (FR); CENTRALE LILLE INSTITUT, Villeneuve d'Ascq (FR); UNIVERSITE POLYTECHNIQUE HAUTS-DE-FRANCE, Valenciennes (FR); Centre national de la recherche scientifique, Paris (FR); YNCREA HAUTS DE FRANCE, Lille (FR); VALEO SYSTÈMES D'ESSUYAGE, Le Mesnil Saint Denis (FR)

( * ) Notice: Subject to any disclaimer, the term of this patent is extended or adjusted under 35 U.S.C. 154(b) by 0 days.

(21) Appl. No.: 17/763,016

(22) PCT Filed: Sep. 24, 2020

(86) PCT No.: PCT/EP2020/076762
§ 371 (c)(1),
(2) Date: Mar. 23, 2022

(87) PCT Pub. No.: WO2021/058666
PCT Pub. Date: Apr. 1, 2021

(65) Prior Publication Data
US 2022/0339669 A1    Oct. 27, 2022

(30) Foreign Application Priority Data

Sep. 25, 2019 (FR) .................................. 1910590

(51) Int. Cl.
*B06B 1/06* (2006.01)
*B08B 7/02* (2006.01)
*B60S 1/56* (2006.01)

(52) U.S. Cl.
CPC ................ *B06B 1/067* (2013.01); *B08B 7/02* (2013.01); *B60S 1/56* (2013.01); *B06B 2201/40* (2013.01)

(58) Field of Classification Search
CPC ....... B06B 1/067; B06B 2201/40; B06B 1/06; B08B 7/02
(Continued)

(56) References Cited

U.S. PATENT DOCUMENTS 4,727,275 A * 2/1988 Milsom .................. H03H 9/643
                                                       333/195
4,768,256 A * 9/1988 Motoda ..................... B60S 1/02
                                                        296/96.15
(Continued)

FOREIGN PATENT DOCUMENTS

CN      101279318 A      10/2008
CN      201724191 U       1/2011
(Continued)

OTHER PUBLICATIONS

WO2017097769A1 - English Machine Translation (Year: 2017).*
(Continued)

*Primary Examiner* — Marc Carlson
(74) *Attorney, Agent, or Firm* — Osha Bergman Watanabe & Burton LLP

(57) ABSTRACT

Electroacoustic device (5) comprising: —an ultrasonic wave transducer (15) comprising a piezoelectric substrate (10) and first (30) and second (35) electrodes in contact with the piezoelectric substrate, and —a carrier (10), the transducer being attached to the carrier and acoustically coupled to the carrier, and the first and second electrodes being sandwiched, at least partly, between the piezoelectric substrate and the carrier, the device being configured to generate an ultrasonic surface wave (W) propagating through the carrier at a distance from the transducer when an electric current passes through the first and second electrodes.

14 Claims, 2 Drawing Sheets

Figure 1:
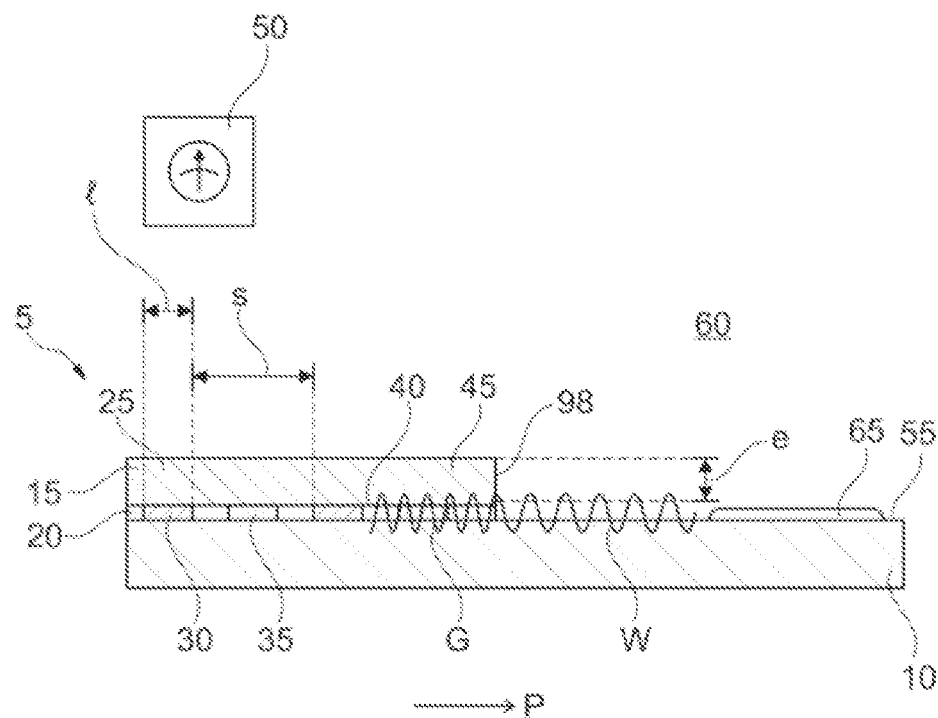

(58) Field of Classification Search
USPC .......................................................... 15/94
See application file for complete search history.

(56) References Cited

U.S. PATENT DOCUMENTS

| | | | | |
|---|---|---|---|---|
| 11,090,698 | B2* | 8/2021 | Bussonniere | ...... G02B 27/0006 |
| 2006/0255682 | A1* | 11/2006 | Huang | ............... H03H 9/02921 |
| | | | | 310/313 B |
| 2013/0056671 | A1* | 3/2013 | Kubota | ................. C04B 35/475 |
| | | | | 15/94 |
| 2013/0239989 | A1* | 9/2013 | Lu | ........................... B08B 7/026 |
| | | | | 15/94 |
| 2013/0298419 | A1 | 11/2013 | Trevett et al. | |
| 2016/0023772 | A1* | 1/2016 | Borigo | ................. B64D 15/163 |
| | | | | 15/94 |
| 2018/0369880 | A1* | 12/2018 | Bussonniere | ............. B60S 1/02 |

FOREIGN PATENT DOCUMENTS

| | | | |
|---|---|---|---|
| CN | 102434405 | A | 5/2012 |
| CN | 103163569 | A | 6/2013 |
| CN | 104056708 | A | 9/2014 |
| CN | 105377455 | A | 3/2016 |
| CN | 205546005 | U | 8/2016 |
| FR | 3044937 | A1 | 6/2017 |
| GB | 2518136 | A | 3/2015 |
| JP | H08-140898 | A | 6/1996 |
| JP | 3190305 | U | 5/2014 |
| JP | 2016527138 | A | 9/2016 |
| JP | 2019508301 | A | 3/2019 |
| KR | 101838596 | B1 * | 4/2018 |
| KR | 2018-0086173 | A | 7/2018 |
| WO | 2012/095643 | A1 | 7/2012 |
| WO | 2015/011064 | A1 | 1/2015 |
| WO | WO-2017097769 | A1 * | 6/2017 ............ B06B 1/067 |
| WO | 2018/050786 | A1 | 3/2018 |
| WO | 2021/058662 | A1 | 4/2021 |
| WO | 2021/058664 | A1 | 4/2021 |

OTHER PUBLICATIONS

International Search Report and Written Opinion for counterpart Application No. PCT/EP2020/076760, dated Dec. 22, 2020.
International Search Report and Written Opinion for counterpart Application No. PCT/EP2020/076758, dated Jan. 11, 2021.
International Search Report and Written Opinion for counterpart Application No. PCT/EP2020/076762, dated Jan. 18, 2021.
Xu, et al., "Glass-on-LiNbO3 heterostructure formed via a two-step plasma activated low-temperature direct bonding method," Applied Surface Science, 459 (2018), pp. 621-629.
Office Action Issued in Corresponding CN Application No. 202080067744.9 Dated Feb. 16, 2023. (12 pages).
Office Action Issued in Corresponding Japanese Application No. 2022-518883, dated Aug. 2, 2024. (10 Pages with English Translation).

* cited by examiner

ELECTROACOUSTIC DEVICE

CROSS REFERENCE TO RELATED APPLICATION

This is a national stage application of PCT/EP2020/076762, filed internationally on Sep. 24, 2020, which claims priority to French Application No. FR 1910590 filed on Sep. 25, 2019, which are incorporated herein, by reference, in their entireties.

The present invention relates to a device for generating an ultrasonic surface wave that propagates in a support and a method implementing this device to melt a body disposed on the support and/or to displace a body in the liquid state on the support.

In various fields, it is necessary to overcome effects linked to the build-up of a liquid on a surface, and to the solidification of this liquid when the temperature of the environment and/or the temperature of the surface is lower than the temperature of solidification of the liquid.

To dispel the drops of liquid accumulated on a surface, it is well known practice to apply a mechanical force to the drops, for example by means of a windshield wiper on a windshield of a motor vehicle. However, a windshield wiper limits the field of vision accessible to the driver. Also, it spreads the fatty particles deposited on the surface of the windshield. In addition, the blades of the windshield wiper have to be renewed regularly.

Moreover, modern motor vehicles generally include one or more driver assistance systems which implement numerous sensors, for example optical sensors, such as a lidar for assessing a distance between the vehicle and an object, or probes, for example a Pitot probe. Now, a mechanical force on the drops cannot easily be applied to clean the surface of such a sensor, for lack of space available for suitable mechanical means which could also damage the surface.

For example, in the motor vehicle field, in winter conditions, it is necessary to defrost the mirror of a rear view mirror, a windshield or a rear window of a vehicle to ensure safe driving. One known defrosting technique consists in blowing hot air over the surface of the windshield opposite to that on which a surface of frost and/or of ice is deposited. However, the defrosting time required by such a technique is particularly high. To defrost a rear window, it is known practice to have therein, in mass or in volume, a metal filament following a path formed by evenly spaced lines. The circulation of an electric current in the filament generates a heating by Joule's effect, which results in the melting of the layer of frost and/or of ice in proximity to the filament in the form of a film of water, then in the evaporation of the film of water. However, such a filament limits the rear field of vision accessible to the driver of the vehicle. Furthermore, the layer of frost and/or of ice generally includes particles which remain in contact with the support once the film of water is evaporated. It is then necessary to proceed often with the cleaning of the rear window, which proves tedious. Furthermore, the formation of frost and/or of ice also disrupts the operation of the sensors of the embedded driving systems.

Moreover, in use, the surfaces of such sensors can also be struck by outside elements such as insects, dust particles, mud, at speeds of the order of that of the vehicle on which they are mounted. A cleaning device for such a surface must therefore be sufficiently robust to withstand such an environment.

There is therefore a need for a device that addresses these drawbacks.

The invention proposes, according to a first of its aspects, an electroacoustic device comprising:
an ultrasonic wave transducer comprising a piezoelectric substrate and first and second electrodes in contact with the piezoelectric substrate, and
a support,
the transducer being fixed onto the support and coupled acoustically with the support and the first and second electrodes being sandwiched, at least partly, between the piezoelectric substrate and the support,
the device being configured to generate an ultrasonic surface wave which propagates in the support at a distance from the transducer, when an electric current passes through the first and second electrodes.

The device according to the invention is robust. Since the first and second electrodes are protected by the support and by the piezoelectric substrate, the degradation thereof is thus limited, for example when the transducer is placed in contact with outside elements as mentioned above.

Moreover, as will emerge more clearly hereinbelow, the device according to the invention can advantageously be implemented to clean a surface covered by a body, for example a liquid.

Preferably, the transducer is configured to generate a guided wave which is transformed into the ultrasonic surface wave in the support at a distance from the transducer. The ultrasonic "guided" wave propagates both in the support and in the transducer, to the respective faces of the substrate and of the support facing one another. In a variant, which will be described hereinbelow, in which the device comprises an intermediate, layer lying between the support and the transducer, the guided wave can also propagate in the intermediate layer. The ultrasonic guided wave can notably be a Stoneley wave.

Preferably, the first and second electrodes are disposed on the piezoelectric substrate. Preferably, they are in contact with the piezoelectric substrate.

Preferably, the first and second electrodes are in contact with the support or are in contact with an intermediate layer, preferably formed by glue, disposed on the support. The generation of the ultrasonic surface wave is thus facilitated. The intermediate layer preferably has a thickness less than the fundamental wavelength of the ultrasonic guided wave. In particular, it can have a thickness less than a tenth of said fundamental wavelength of the guided wave, in order to limit the transmission losses through the intermediate layer.

The device can be configured so that the fundamental frequency of the ultrasonic guided wave lies between 0.1 MHz and 1000 MHz, preferably lies between 10 MHz and 100 MHz, for example equal to 40 MHz.

Preferably, the thickness of the piezoelectric substrate is greater than the fundamental wavelength of the ultrasonic guided wave. The ultrasonic guided wave is thus prevented from reaching the face opposite that coated by the first and second electrodes. Advantageously, an additional member, such as a protection member as described hereinbelow, can be disposed on said opposite face without the guided wave being able to reach the member.

A part of the first electrode, respectively of the second electrode, can protrude from the support. The part of the first electrode, respectively of the second electrode, protruding from the support can define an electrical power supply connector. The electrical power supply connector can be configured to be electrically linked to a current generator.

Moreover, the invention proposes, according to a second of its aspects, an acoustic device comprising:

an ultrasonic wave transducer comprising a piezoelectric substrate and first and second electrodes in contact with the piezoelectric substrate, and a support, the transducer being fixed onto the support and coupled acoustically with the support, the transducer protruding from an edge of the support, the first and second electrodes coating a face of the substrate opposite the support and being disposed on a portion of the piezoelectric substrate not superposed on the support, the device being configured to generate an ultrasonic surface wave that propagates in the support at a distance from the transducer, when an electric current passes through the first and second electrodes.

The first and second electrodes can thus be protected from the outside elements by the piezoelectric substrate, which limits the degradation thereof. Moreover, since the electrodes are disposed protruding from the edge of the substrate, the area of the support coated by the transducer is reduced.

Furthermore, the specific disposition of the first and second electrodes makes it possible to reduce the heating of the device during the generation of the ultrasonic wave. In particular, since the electrodes are not disposed on the support, the heating of the support by conduction of the heat produced by the electrodes is thus limited.

Furthermore, in a variant according to which the transducer is glued onto the support h means of a polymer adhesive, the risk of separation between the transducer and the support, which can result from excessive heating of the adhesive by the conversion of a portion of the energy of the ultrasonic wave that the latter has absorbed, is reduced.

The transducer is preferably configured to generate a primary ultrasonic wave that propagates in the substrate and which is transformed into the ultrasonic surface wave that propagates in the support at a distance from the transducer, when an electric current passes through the first and second electrodes.

The device according to any one of its aspects can also have any one of the following optional features.

The transducer can be fixed onto the support in different ways. It can be glued onto the support, notably by means of a polymer adhesive. The adhesive can be cross-linkable by illumination by means of an ultraviolet radiation. It is for example an epoxy resin. The transducer can be fixed by molecular adhesion, or by means of a thin metallic layer ensuring the adhesion between the support and the substrate. The layer can also be made of a metal or of an alloy with low melting point, i.e. having a melting point lower than 200° C., for example an alloy of indium. As a variant, the metallic layer can be made of a metal or of an alloy having a melting point higher than 200° C., for example an alloy of aluminum and/or of gold.

An example of fixing by molecular adhesion is described in "Glass-on-LiNhO$_3$ heterostructure formed via a two-step plasma activated low-temperature direct bonding method", J. Xu et al., Applied Surface Science 459 (2018) 621-629, doi: 10.1016/j.apsusc.2018.08.031. According to another variant, the transducer can be fixed onto the support by means of a method comprising a step of melting of a portion of the substrate and/or of a portion of the support followed by a step consisting in compressing together the substrate and the support, the respective molten portions of the support and substrate being in contact with one another. According to another variant, the transducer can be fixed onto the support by means of a method comprising the deposition of bond coats made of an alloy with a low melting point on a portion of the substrate and on a portion of the support respectively, the at least partial melting of said bond coats, then the compression of the substrate with the support, the faces of the bond coats opposite the support and the substrate being brought into contact with one another during the compression. The bond coats can be deposited by cathode sputtering, or by an evaporation technique implemented in the field of thin film deposition. The substrate is preferably glued onto the support. The face of the substrate opposite the support is preferably glued onto the support, by means of an intermediate layer of glue which also acoustically couples the transducer to the support. Preferably, the thickness of the layer of glue is less than the wavelength of the primary ultrasonic wave in order for the latter to be able to be transmitted effectively from the transducer to the support, that is to say by limiting the dissipation in the layer of glue.

The device according to any one of its aspects can have one of the following features.

The device can be configured so that the fundamental frequency of the ultrasonic surface wave lies between 0.1 MHz and 1000 MHz, preferably lies between 10 MHz and 100 MHz, for example equal to 40 MHz.

The ultrasonic surface wave can be a Rayleigh wave or a Lamb wave. In particular, it can be a Rayleigh wave when the support has a thickness greater than the wavelength of the ultrasonic surface wave. A Rayleigh wave is preferred because a maximum proportion of the energy of the wave is concentrated on the face of the support on which it propagates, and can be transmitted to a body in contact with the support.

The device can be configured for the amplitude of the ultrasonic surface wave to lie between 1 picometer and 500 nanometers. The amplitude can depend on the frequency of the fundamental wave. Notably, the higher the frequency, the lower the amplitude can be. The amplitude of the ultrasonic surface wave corresponds to the normal displacement of the face of the support on which the ultrasonic surface wave propagates and can be measured by laser interferometry.

The support can be made of any material capable of propagating an ultrasonic surface wave. The support, can be chosen for the attenuation length of the surface wave in the support to be greater than the zone to be insonified The support can be self-supporting, in as much as it can be deformed, notably elastically, without breaking under its own weight.

The face of the support on which the longitudinal surface wave propagates can be flat. It can also be curved, provided that the radius of curvature of the face is greater than the wavelength of the ultrasonic surface wave.

The face can be rough. The roughnesses will preferably be less than the fundamental wavelength of the ultrasonic surface wave, in order to prevent them from significantly affecting the propagation thereof.

The support can notably take the form of a flat or curved plate. The thickness of the support can be less than 0.01 m. The length of the support can be greater than 1 mm, even greater than 1 cm, even greater than 1 m.

The area of a face of the plate can lie between 0.01 m$^2$ and 10 m$^2$.

"Thickness of the support" is considered to be the smallest dimension of the support measured in a direction at right angles to the surface on which the ultrasonic wave propagates.

The support can be optically transparent, notably to light in the visible or to radiation in the ultraviolet or in the infrared. The method is thus then particularly suited to applications in which improving the visual comfort of a user observing his or her environment through the support is sought.

The support can be made of a material chosen from among piezoelectric materials, polymers, in particular thermoplastics, notably polycarbonate, glasses, metals and ceramics.

Preferably, the support is made of a material other than a piezoelectric material.

Preferably, the support is chosen from the group formed by:
- a motor vehicle surface, for example chosen from among a windshield of a vehicle, a glass of a rear view mirror, or
- a visor of a headset,
- a window of a building,
- a sensor, for example an optical sensor, a thermal sensor, an acoustic sensor or a pressure or speed sensor, notably a probe, for example a Pitot probe,
- a surface of an optical device, the optical device being for example chosen from among a lens of a camera, an eyewear lens, and
- a protection element of such a sensor.

Other types of support can be envisaged. Notably, the support can be a substrate of a laboratory-on-a-chip, notably intended for microfluidic applications.

The support can be an element of the structure of an aircraft, for example a wing, a fuselage or a tail unit.

The support preferably has a thin form. The ratio of the length of the support to the thickness of the support can be greater than 10, even greater than 100, even greater than 1000.

The support can even be chosen from among an element of a heat exchanger, a plumbing installation and an element of a ventilation system. Such media generally have surfaces that are difficult to access to dispel the drops of liquid which are deposited thereon, for example by condensation, and which can solidify.

The support can be a food storage element, for example an inner wall of a refrigerator, or a wall exposed to the condensation of a liquid that can solidify. For example, in a refrigerator, the condensation of the drops of water and the solidification thereof on a wall increases the heat exchange between the wall and the cool air volume of the refrigerator, reducing its efficiency.

The ratio of the area of the support covered by the transducer to the area of the face of the support to which the transducer is fixed can be less than 15%.

The transducer preferably has a thin form. The ratio of the length of the transducer to the thickness of the transducer can be greater than 10, even greater than 100, even greater than 1000.

The transducer can take the form of a plate, flat or curved.

The transducer can have a thickness of between 10 picometers and 1 micrometer. The transducer can have a length and/or a width preferably lying between 1 millimeter and 20 cm.

Preferably, the first and second electrodes form first and second interdigital combs.

The first and second combs can preferably comprise a base from which a row of fingers extends, the fingers being preferably parallel to one another. The fingers can have a width lying between the fundamental wavelength of the ultrasonic wave divided by 8 and the fundamental wavelength of the ultrasonic wave divided by 2. The width of the fingers partly determines the fundamental frequency of the ultrasonic surface wave. Moreover, a small finger width increases the electrical resistance of the transducer, which may be reflected by a heating which can contribute to the melting of a body which is in contact with the support or to maintaining the body in the liquid state.

Moreover, the spacing between two successively adjacent fingers of a row of the first comb, respectively of the second comb, can lie between the fundamental wavelength of the ultrasonic wave divided by 8 and the fundamental wavelength of the ultrasonic wave divided by 2.

The number of interdigital fingers can be increased to increase the quality factor of the transducer.

Each comb preferably comprises between 2 and 50 fingers.

The substrate can be a thin layer deposited, for example by chemical vapor deposition or by physical vapor deposition, on the support. As a variant, the substrate can be self-supporting, that is to say rigid enough not to bend under the effect of its own weight. The self-supporting substrate can be fixed, for example glued, onto the support.

The piezoelectric material can be chosen from the group formed by lithium niobate, aluminum nitride, lead zirconate titanate, zinc oxide, and the mixtures thereof. The piezoelectric material can be opaque to light in the visible.

In a variant, the support is formed by the piezoelectric material and the transducer comprises the support. The first and second combs are preferably disposed in contact with the support.

In another variant, the support is made of a material other than a piezoelectric material and the electrodes are disposed on the intermediate substrate.

The first and second electrodes can be deposited by photolithography on the support and/or on the substrate.

A body can be disposed on a face of the support at a distance from the transducer.

The portion of the body furthest away from the transducer can be at a maximum distance of 1 meter.

The temperature of the support can be lower than 0° C., even than −10° C. and the body can be aqueous.

The body can be in contact with the face of the support onto which the transducer is fixed, or on the face opposite the face of the support onto which the transducer is fixed. The body can be in contact with the face of the support onto which the transducer is fixed and another body can be in contact with the face on which the body is disposed.

The body can comprise a part in the solid state and a part in the liquid state. For example, the body can be water and be formed by a frosty, icy or snowy portion and a liquid portion in contact with the frosty, icy or snowy portion respectively.

The body in the liquid state can take the form of at least one drop or of at least one film. "Film" is understood to mean a thin film formed on the support. The film can be continuous or discontinuous.

The body can be aqueous. In particular, it can be rainwater or dew water. The rainwater and/or the dew water can notably contain particles. Dew water forms a sludge on the surface of a support. It results from the condensation on the support, in ad hoc pressure and temperature conditions, of the water in vapor form contained in the air. The body can have been deposited by condensation before solidifying on the support.

The body in the solid state can be chosen from among frost, ice and snow. The body in the liquid state can be a sheet or at least one drop, for example a sludge. A "frost" is formed by drops of water that have solidified before having been deposited on the support. "Ice" is formed by drops of water that have condensed on the support and then have solidified on the support.

Moreover, in order to protect the transducer, notably from outside elements as mentioned above, the device preferably comprises a protection member superposed on the piezoelectric substrate.

Preferably, the transducer is housed in a chamber defined by the protection member and the support.

In particular, in the device according to the first aspect of the invention, at least one, even all, of the faces of the substrate not coated by the first and second electrodes can be in contact with the protection member.

The protection member is preferably at a distance from the support, so as to not to disturb the propagation of the ultrasonic surface wave.

The protection member can be in contact with a face of the transducer not coated by the first and second electrodes. It does not then interact with the guided wave or with the primary wave. Preferably, the protection member is in contact with the face of the transducer opposite the face on which the first and second electrodes are deposited. In particular the protection member can be fixed, for example glued, onto the transducer. The manufacture of the device is thus simplified.

Moreover, the device can be linked electrically to a current generator to electrically power the transductor. The current generator can be configured to deliver an electrical power supply preferably lying between 1 milliwatt and 500 watts.

Moreover, the invention relates to a method for manufacturing the device according to the invention, comprising the following successive steps of:
a) forming first and second electrodes on a face of a piezoelectric substrate so as to obtain a wave transducer,
b) fixing the wave transducer onto a support, to obtain said device.

Preferably, the support and: or the wave transducer is coated with a layer of glue, then the duly coated support and/or wave transducer are assembled.

The invention relates also to a first method comprising the synthesis, by means of an electroacoustic device according to the invention, of an ultrasonic surface wave that propagates in the support to a liquid body disposed on a face of the support and at a distance from the transducer, the energy of the ultrasonic wave being sufficient to induce a displacement of the body on the support.

The body can be displaced in the direction of propagation of the ultrasonic surface wave.

The invention relates also to a second method comprising:
the provision of an electroacoustic device according to the invention, and
the electrical powering of the wave transducer to synthesize an ultrasonic surface wave that propagates in the support to a body disposed on a face of the support and at a distance from the transducer, at least a portion of the electrical power supply energy being converted into heat form by the transducer,
the electrical energy powering the transducer being sufficient for the heat and the energy of the ultrasonic surface wave to induce:
the melting of the body when the body is in the solid state, and/or the maintaining of the body in the liquid state when the temperature of the support is lower than the temperature of solidification of the body.

The energy of the ultrasonic wave can, furthermore, be sufficient to induce the displacement of the molten body or of the body maintained in the liquid state on the face.

The invention relates also to a third method comprising:
the provision of a device comprising:
an ultrasonic wave transducer comprising a piezoelectric substrate, first and second electrodes in contact with the piezoelectric substrate and a support, the transducer being fixed onto the support and coupled acoustically with the support, the first and second electrodes being sandwiched, at least partly, between the piezoelectric substrate and the support, the device being configured to generate an ultrasonic surface wave that propagates in the support at a distance from the transducer, when an electric current passes through the first and second electrodes, the transducer being configured to generate a guided wave which is transformed into the ultrasonic surface wave in the support at a distance from the transducer,
the synthesis, by means of said device, of an ultrasonic surface wave that propagates in the support to a liquid body disposed on a face of the support and at a distance from the transducer, the energy of the ultrasonic wave being sufficient to induce a displacement of the body on the support,
the body being a sheet or being a drop having a diameter less than or equal to 5 mm.

"Diameter" of the body is understood to mean the diameter of the smallest sphere circumscribed on the body. The diameter of the body is determined prior to the synthesis of the ultrasonic wave.

The first method and/or the second method and/or the third method can comprise the following features.

The body can have any one of the above features.

The body can be a sheet. The sheet can extend on the support over a surface area greater than or equal to 2 $cm^2$, even greater than or equal to 5 $cm^2$, even greater than or equal to 10 $cm^2$, even greater than or equal to 100 $cm^2$, even greater than or equal to 500 $cm^2$. The thickness of the sheet can lie between 10 µm and 10 mm, even between 50 µm and 5 mm.

The body can be a drop having a diameter less than or equal to 5 mm. The drop can have a diameter less than or equal to 1 mm, even less than or equal to 0.1 mm. The drop can have a diameter lying between 2 mm and 5 mm. It can have a diameter lying between 0.1 mm and 2 mm.

The body can be displaced in the direction of propagation of the ultrasonic surface wave.

The body can be displaced along the face of the support on which it is disposed.

Moreover, the temperature of the support can be lower than 0° C., and the body is preferably aqueous.

Finally, the invention relates to the use of the device according to the invention, to clean and: or clear and/or defrost a face of a support, notably a motor vehicle surface.

Figure 2:
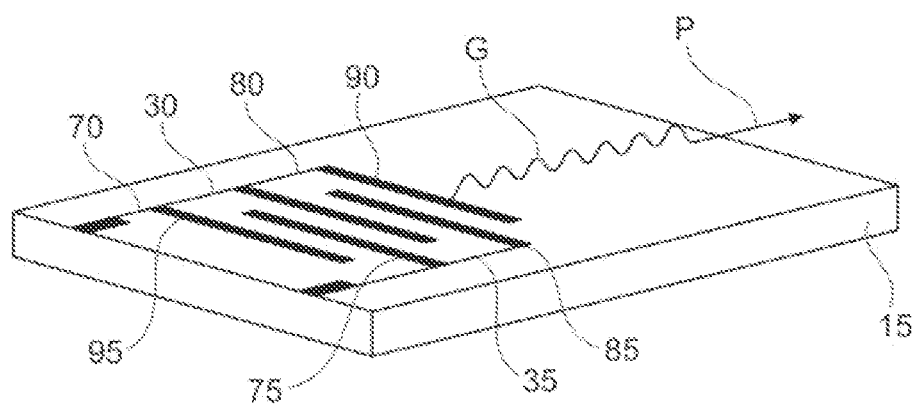
Figure 3:
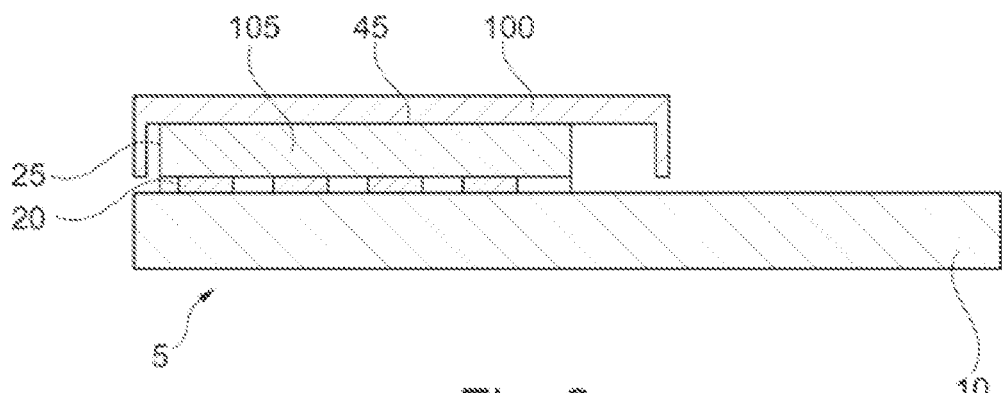
Figure 4:
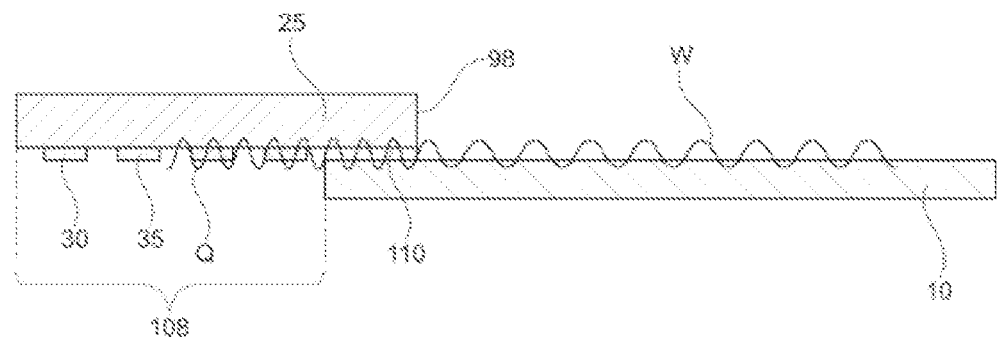

The invention will be able to be better understood on reading the following detailed description, of nonlimiting exemplary implementations thereof, and on studying the attaching drawing, in which:

FIG. 1 represents schematically, and in cross-section, an example of electroacoustic device according to the invention, FIG. 2 represents, in perspective, the wave transducer of the electroacoustic device illustrated in FIG. 1, FIG. 3 represents another example of electroacoustic device according to the invention, and FIG. 4 represents yet another example of electroacoustic device according to the invention.

The constituent elements of the drawing are not represented to scale in the interests of clarity.

DETAILED DESCRIPTION

FIG. 1 illustrates a first example of an electroacoustic device 5 according to the first aspect of the invention.

It comprises a support 10 onto which a transducer 15 is fixed, by means of a layer of glue 20. The layer of glue acoustically couples the support to the transducer.

The transducer comprises a substrate 25 and first 30 and second 35 electrodes which coat a face 40 of the substrate.

The substrate is made of a piezoelectric material, for example of 128° Y-cut lithium niobate. It takes the form of a plate, the thickness e of which is greater than the wavelength of the wave generated by the transducer. Thus, the wave generated by the transducer is transmitted directly in the support and does not reach the face 45 of the substrate opposite that on which the support is mounted.

The first and second electrodes are sandwiched between the support and the substrate and are linked to a voltage generator 50 which powers them electrically. They are thus disposed facing the support, and are protected by the support, the substrate and the layer of glue.

The support in the example illustrated takes the form of a plate and has a top face 55 in contact with the outside environment 60. In the example illustrated, it is covered by a body 65 in the form of a film of water. The body 65 can be a drop or a sheet. For example, the sheet is formed by the clustering of drops, for example of rain, on the support.

To manufacture the device, the first and second electrodes can be formed by an evaporation or sputtering method and shaped by photolithography. Then can be made of chromium, or aluminum or of the combination of a bond coat such as titanium and a conductive layer such as gold. The duly covered substrate can then be glued onto the support. In order to facilitate the gluing operation, a self-supporting support is preferred, As is illustrated in FIG. 2, the first 30 and second 35 electrodes form first 70 and second 75 combs. Each comb comprises a base 80, 85 and a row of fingers 90, 95, extending parallel to one another from the base. The first and second combs are interdigital.

Each of the fingers of the first comb, respectively of the second comb, has a width 1 equal to the fundamental wavelength of the ultrasonic surface wave divided by 4 and the spacing S between two successive fingers of a comb is equal to the fundamental wavelength of the ultrasonic surface wave divided by 4.

The spacing between the fingers determines the resonance frequency of the transducer which the person skilled in the art can easily determine. An alternative voltage is applied by the generator 50 and can be amplified, such that the transducer generates art ultrasonic surface wave.

The alternating electrical powering of the first and second electrodes induces a mechanical response from the piezoelectric material, which results in the generation of a guided surface wave G which propagates in the support in a direction of propagation P, notably toward the body disposed on the support.

For a configured transducer to generate a wave of predetermined fundamental frequency, the determination of the energy generated by the transducer that is sufficient to displace or melt the body and/or maintain it in the liquid state is easy for the person skilled in the art. Notably, the person skilled in the art can link the fundamental frequency of the ultrasonic guided wave to the frequency of the electrical signal to generate the wave. He or she can then vary the amplitude of the electrical signal so as to determine the sufficient electrical energy to be supplied to the transducer.

When the transducer is electrically powered by the voltage generator, it generates an ultrasonic wave. Since the first and second electrodes are sandwiched between the support and the substrate, the wave G generated by the transducer is guided and propagates at the interface between the support and the substrate, defined by the face of the substrate coated by the electrodes and by the face of the support facing the electrodes. When the guided wave reaches the lateral end 98 of the substrate along its direction of propagation, it is transmitted in the support in the form of an ultrasonic surface wave W which propagates on the surface of the support. The transformation of the guided wave into a surface wave results from the absence of interface between two solids in the portion of the support not covered by the transducer. The surface wave then interacts with the body covering the support. For a liquid body, a transducer synthesizing a surface wave with a fundamental frequency lying between 0.1 MHz and 1000 MHz, preferably lying between 10 MHz and 100 MHz, for example equal to 40 MHz, is well suited to ensuring the displacement of a film of water. In the variant in which the film of water is in the form of ice or of frost, it is also well suited to provoking the melting of the film of water, by the input of energy from the ultrasonic surface wave and by the transfer of the heat that it generates, notably by resistive heating of the electrodes.

The device illustrated in FIG. 3 differs from that illustrated in FIG. 1 in that it further comprises a protection member 100 which is superposed on the support and on the transducer. Together with the support, it defines a chamber 105 in which the transducer is housed. The transducer, and more particularly the substrate, is thus protected from the outside elements, such as precipitations and dust. The protection member is fixed onto the face 45 of the substrate not coated by the first and second electrodes. Since the substrate has a thickness greater than the wavelength of the guided wave, the protection member does not interact with the guided wave. The protection member can be made of an impact-resistant material, such as a metal or a thermoplastic. In the example illustrated, the protection member is at a distance from the support. Thus, it does not hamper the propagation of the ultrasonic surface wave in the support.

Finally, the device illustrated in FIG. 4 differs from the device illustrated in FIG. 1 in that it comprises a portion protruding from the edge of the support, and the first and second electrodes are disposed on a portion 108 of the piezoelectric substrate not superposed on the support. Since the first and second electrodes are at a distance from the support, it is easy to connect them electrically to the voltage generator.

When the substrate is powered electrically, the device generates a primary wave Q which propagates on the surface of the substrate then at the interface 110 between the substrate and the support. When the primary wave reaches the lateral end 98 of the substrate along its direction of propagation, it is transmitted in the support in the form of an ultrasonic surface wave which propagates on the surface of the support. As in the example of FIG. 1, the ultrasonic surface wave can induce the displacement of a liquid on the support.

Of course, the invention is not limited to the embodiments of the method, and notably to the examples, presented in the present description.

The invention claimed is:

1. An electroacoustic device comprising:
   a support; and
   an ultrasonic wave transducer acoustically coupled to the support and configured to generate guided waves that transform into ultrasonic surface waves within the support and at a distance from the transducer, the ultrasonic wave transducer comprising:
   a piezoelectric substrate; and
   first and second electrodes that coat a first face of the piezoelectric substrate and that are sandwiched between the piezoelectric substrate and the support,
   wherein the ultrasonic surface waves have a fundamental frequency of between 10 MHz and 1000 MHZ,
   wherein the ultrasonic wave transducer is fixed onto the support by molecular adhesion, and
   wherein the first electrodes and the second electrodes form a first comb and a second comb, each finger of the first comb and the second comb has a width equal to a wavelength of the ultrasonic surface wave divided by an integer.

2. The device of claim 1, wherein the first and second electrodes directly contact the support or contact an intermediate layer disposed between the support and the first and second electrodes.

3. The device of claim 1, wherein;
   the piezoelectric substrate includes a second face opposite from the first face; and
   a thickness of the piezoelectric substrate, defined between the first and second faces, is greater than the fundamental wavelength of the ultrasonic guided waves,
   whereby the ultrasonic guided waves are transmitted directly in the support and do not reach the second face of the piezoelectric substrate.

4. The device of claim 1, wherein portions of the first and second electrodes protrude from the support.

5. The device of claim 1, further comprising a protection member disposed on the piezoelectric substrate.

6. The device of claim 5, wherein the ultrasonic wave transducer is disposed in a chamber defined in the protection member and the support.

7. The device of claim 1, further comprising an adhesive layer connecting the piezoelectric substrate to the support.

8. The device of claim 1, wherein the support comprises:
   a motor vehicle surface;
   a visor of a headset;
   a window of a building;
   a sensor;
   a lens of an optical device; or
   a protection element of an optical device.

9. An electroacoustic device comprising:
   a support; and
   an ultrasonic wave transducer that is acoustically coupled with the support and protrudes from an edge of the support, the ultrasonic wave transducer comprising:
   a piezoelectric substrate; and
   first and second electrodes disposed on a portion of the piezoelectric substrate that extends from the edge of the support and that is not superposed on the support,
   wherein the ultrasonic wave transducer is configured to generate ultrasonic surface waves that propagate through the support, beginning at distance from the ultrasonic wave transducer, when an electric current is applied to the first and second electrodes,
   wherein the ultrasonic wave transducer is fixed onto the support by molecular adhesion, and
   wherein the first electrodes and the second electrodes form a first comb and a second comb, each finger of the first comb and the second comb has a width equal to a wavelength of the ultrasonic surface wave divided by an integer.

10. The device of claim 9, further comprising an adhesive layer connecting the piezoelectric substrate to the support.

11. The device of claim 9, further comprising a protection member disposed on the piezoelectric substrate.

12. The device of claim 9, wherein the ultrasonic wave transducer is disposed in a chamber defined in the protection member and the support.

13. The device of claim 9, wherein the support comprises:
   a motor vehicle surface;
   a visor of a headset;
   a window of a building;
   a sensor;
   a lens of an optical device; or
   a protection element of an optical device.

14. An electroacoustic device comprising:
   a support; and
   an ultrasonic wave transducer acoustically coupled to the support and configured to generate guided waves that transform into ultrasonic surface waves within the support and at a distance from the transducer, the ultrasonic wave transducer comprising:
   a piezoelectric substrate; and
   first and second electrodes that coat a first face of the piezoelectric substrate and that are sandwiched between the piezoelectric substrate and the support,
   wherein the ultrasonic surface waves have a fundamental frequency of between 10 MHz and 1000 MHZ,
   wherein the ultrasonic wave transducer is fixed onto the support by molecular adhesion, and
   wherein the first electrodes and the second electrodes form a first comb and a second comb, each finger of the first comb and the second comb has a width equal to a wavelength of the ultrasonic surface wave divided by an integer,
   wherein the transducer has a thickness of between 10 picometers and 1 micrometer, and
   wherein a ratio of a length of the transducer to the thickness of the transducer is greater than 10.

* * * * *